United States Patent
Martin, III

(10) Patent No.: US 8,764,601 B2
(45) Date of Patent: Jul. 1, 2014

(54) CARRIER WITH CENTER BACKBONE AND DUAL LATERAL CASES

(75) Inventor: Robert J. Martin, III, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 36 days.

(21) Appl. No.: 13/218,696

(22) Filed: Aug. 26, 2011

(65) Prior Publication Data
US 2013/0047779 A1 Feb. 28, 2013

(51) Int. Cl.
*F16H 48/06* (2006.01)

(52) U.S. Cl.
USPC ........................................................ 475/230

(58) Field of Classification Search
USPC ........................................................ 475/230
See application file for complete search history.

(56) References Cited

U.S. PATENT DOCUMENTS

| | | | |
|---|---|---|---|
| 1,430,367 A * | 9/1922 | Ford | 475/229 |
| 1,692,932 A * | 11/1928 | Ford | 228/173.1 |
| 1,886,924 A | 11/1932 | Van Ranst | |
| 2,047,336 A | 7/1936 | Stout | |
| 2,942,893 A | 6/1960 | Nallinger | |
| 2,978,054 A | 4/1961 | Ludwig | |
| 3,213,700 A | 10/1965 | Brownyer | |
| 3,231,040 A | 1/1966 | Blanchette | |
| 3,333,866 A | 8/1967 | Cuskie | |
| 3,401,763 A | 9/1968 | Rolt | |
| 3,403,746 A | 10/1968 | Fox et al. | |
| 3,497,235 A | 2/1970 | Peer | |
| 3,872,741 A | 3/1975 | Berchtold et al. | |
| 4,221,138 A * | 9/1980 | Stewart et al. | 74/607 |
| 4,467,672 A * | 8/1984 | Lamy | 475/246 |
| 4,543,853 A * | 10/1985 | von Hiddessen et al. | 475/246 |
| 4,630,699 A | 12/1986 | Yamada et al. | |
| 4,651,587 A | 3/1987 | Anderson et al. | |
| 4,699,235 A | 10/1987 | Anderson | |
| 4,705,128 A | 11/1987 | Krude | |
| 4,733,578 A * | 3/1988 | Glaze et al. | 475/246 |
| 4,781,079 A * | 11/1988 | Takahashi | 475/240 |
| 4,793,211 A * | 12/1988 | Schmidt | 475/246 |
| 4,893,525 A * | 1/1990 | Gabor | 475/241 |
| 5,070,745 A | 12/1991 | Lindsey et al. | |
| 5,162,026 A | 11/1992 | Krisher | |
| 5,297,447 A * | 3/1994 | Massaccesi | 74/607 |
| 5,515,940 A | 5/1996 | Shichinohe et al. | |
| 5,584,777 A * | 12/1996 | Sander et al. | 475/230 |
| 5,624,345 A | 4/1997 | Graft et al. | |
| 5,673,777 A | 10/1997 | Ziech | |
| 5,806,371 A | 9/1998 | Hibbler et al. | |
| 6,093,127 A | 7/2000 | DiDomenico et al. | |
| 6,146,304 A * | 11/2000 | Bendtsen | 475/230 |
| 6,227,716 B1 | 5/2001 | Irwin | |

(Continued)

FOREIGN PATENT DOCUMENTS

JP 59144856 A 8/1984

OTHER PUBLICATIONS

U.S. Appl. No. 13/046,943.

*Primary Examiner* — Dirk Wright
(74) *Attorney, Agent, or Firm* — Brooks Kushman P.C.

(57) ABSTRACT

A carrier assembly includes a backbone having an internal cavity configured to receive a differential. A first lateral case is attached to a first end of the backbone and a second lateral case is attached to a second end of the backbone.

15 Claims, 6 Drawing Sheets

(56) References Cited

U.S. PATENT DOCUMENTS

| | | |
|---|---|---|
| 6,398,689 B1 | 6/2002 | Morse et al. |
| 6,474,873 B1 | 11/2002 | Krisher et al. |
| 6,523,435 B2 * | 2/2003 | Ruehle et al. ............... 74/606 R |
| 6,540,640 B2 | 4/2003 | Hibbler et al. |
| 7,001,302 B2 * | 2/2006 | Wachter et al. ............... 475/230 |
| 7,108,428 B2 | 9/2006 | Ason et al. |
| 7,175,560 B2 | 2/2007 | Petruska et al. |
| 7,393,141 B2 | 7/2008 | Fahrni et al. |
| 7,485,065 B2 | 2/2009 | Kearney |
| 7,559,403 B2 | 7/2009 | Schmitz |
| 7,628,457 B2 * | 12/2009 | Pochatila et al. ............. 301/132 |
| 7,794,153 B2 | 9/2010 | Szczepanski et al. |
| 7,866,433 B2 | 1/2011 | Martin et al. |
| 2002/0198075 A1 | 12/2002 | Prucher |
| 2009/0203488 A1 | 8/2009 | Hultgren |
| 2009/0211386 A1 | 8/2009 | Hayes |

\* cited by examiner

CARRIER WITH CENTER BACKBONE AND DUAL LATERAL CASES

TECHNICAL FIELD

This invention generally relates to carrier that includes a center backbone case with a lateral case attached to each side of the center backbone case.

BACKGROUND OF THE INVENTION

One known carrier configuration for driving independently suspended wheels comprises a two-piece carrier case configuration having a main carrier shell or backbone and a flange side lateral case attached to the backbone. The carrier houses a differential that receives driving input from a ring and pinion gear, and which provides driving output to a pair of output shafts.

A differential gear set is housed within a differential case. The differential case includes a first differential case half typically referred to as the "flange case half" and a second differential case half typically referred to as the "plain case half," which are attached to each other to enclose the differential gear set within the differential case. The ring gear is fixed to the flange case half and each of the flange and plain case halves is supported by a differential bearing. The differential can also include a locking mechanism that can lock the output shafts and differential together to rotate as unit when needed. The backbone and flange side lateral case are attached to each other to form a carrier housing that encloses the differential.

When this type of carrier uses axial loading of the differential, one of two configurations is required. Either a bolt-on pinion cage is required, or a wide spacing of the differential bearings is required to provide clearance to load the pinion gear internally, this results in a wider than needed carrier. One example configuration includes a backbone with a pedestal for mounting the plain side differential bearing and differential lock components and a flange side lateral case that includes the flange side differential bearing. This design requires a bolt-on pinion cage because the pedestal is located directly in front of the pinion gear head. Bolt-on cages are disadvantageous for certain applications due to interference with the vehicle frame. Bolt-on cages also increase the overall cost and add potential oil leak paths.

SUMMARY OF THE INVENTION

A carrier assembly includes a backbone having an internal cavity configured to receive a differential. A first lateral case is attached to a first end of the backbone and a second lateral case is attached to a second end of the backbone.

In one example, the carrier assembly is used in a drive unit for driving a pair of laterally spaced wheels. A ring gear and pinion gear provide driving input to the differential, which includes a flange case half and a plain case half that are secured together to enclose a differential gear assembly. The carrier assembly has a carrier housing that includes the backbone that houses the differential. The backbone has a flange case end and a plain case end. The first lateral case comprises a flange side lateral case that is attached to the flange case end and the second lateral case comprises a plain side lateral case that is attached to the plain case end.

These and other features of the present invention can be best understood from the following specification and drawings, the following of which is a brief description.

DETAILED DESCRIPTION OF THE PREFERRED EMBODIMENT

Figure 1:
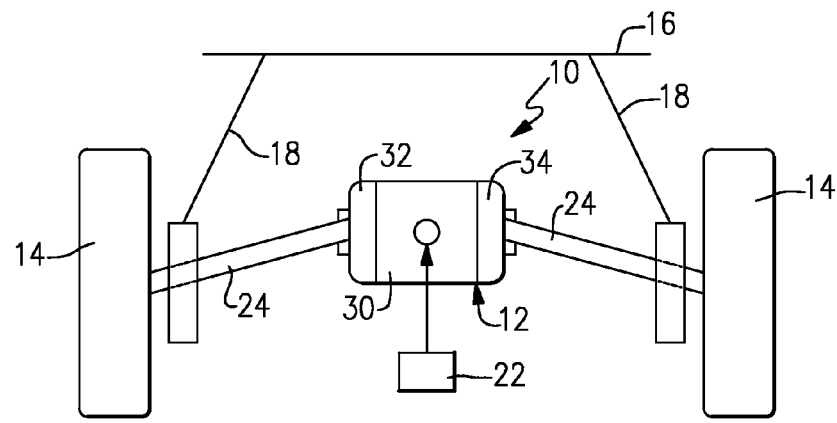
FIG. 1 is a schematic diagram of a drive unit with a carrier assembly for driving laterally spaced wheels that are independently suspended from a vehicle frame.

FIG. 1 represents a highly schematic view of a drive unit 10 that includes a carrier assembly 12 to drive a pair of laterally spaced wheels 14. Each wheel 14 is independently attached to a vehicle frame 16 with an independent suspension schematically indicated at 18. Any type of independent suspension can be used to attach the wheels 14 to the frame. The carrier assembly 12 receives driving input from a power source 22, such as an internal combustion engine or electric motor for example, and provides driving output to wheel shafts 24 that are configured to drive the wheels 14.

Figure 2:
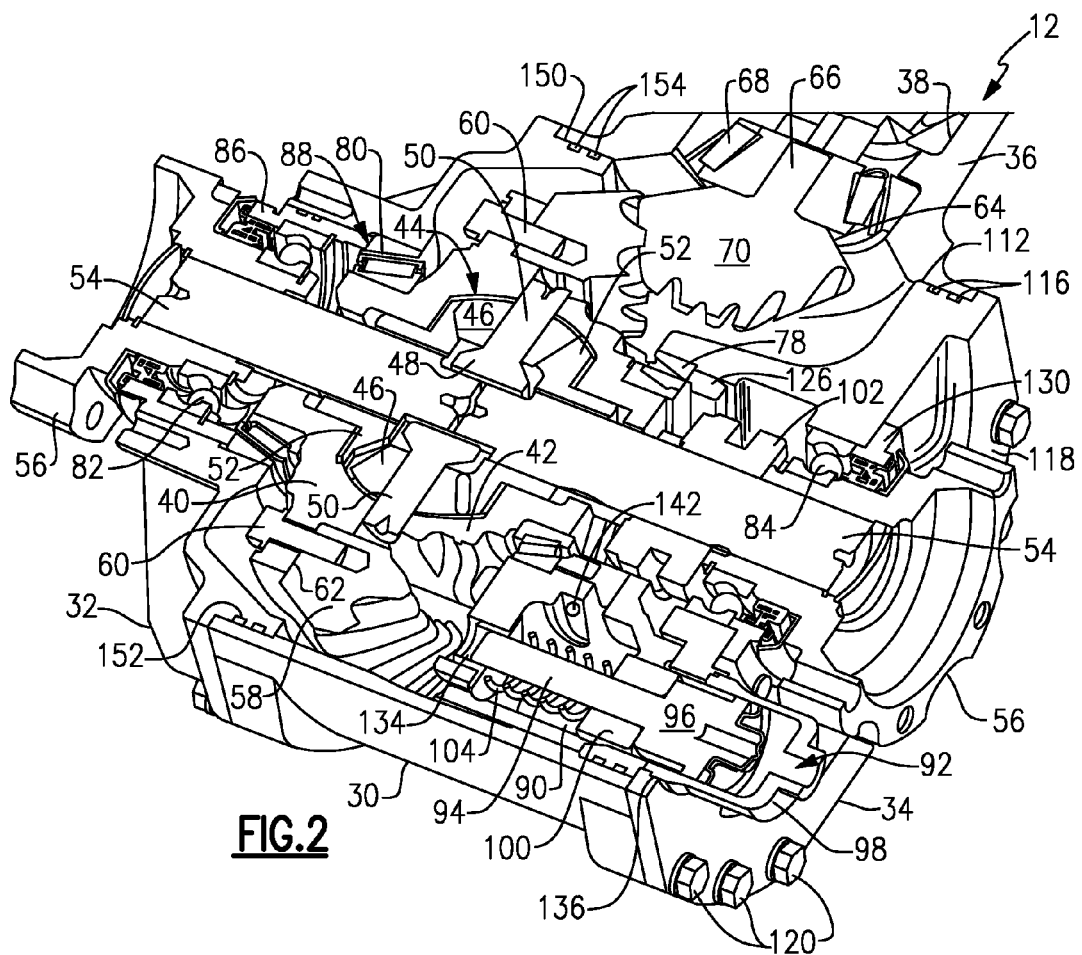
FIG. 2 is a cross-sectional view of a carrier assembly including a backbone, a flange side lateral case, and a plain side lateral case.

The carrier assembly 12 includes a carrier housing that is comprised of a backbone 30, a first lateral case 32, and a second lateral case 34. The carrier assembly is shown in greater detail in FIG. 2. The backbone 30 includes a tubular extension portion 36 formed in an outer periphery that defines an opening 38 into the backbone 30 to receive a driving input member. The carrier assembly 12 houses a differential comprised of a flange case half 40 secured to a plain case half 42 to enclose a differential gear set 44. The differential gear set 44 includes a plurality of differential pinion gears 46 that are supported on a differential spider 48. The differential spider 48 is configured to have a cross-shape with four legs 50 (only two legs are shown in FIG. 2). One pinion gear 46 is supported on each leg 50 as known. The pinion gears 46 are in meshing engagement with side gears 52. Each side gear 52 is connected to an output shaft 54. The output shafts 54 are configured for connection to the wheel shafts 24 via yokes 56.

A ring gear 58 is fixed to the flange case half 40 with a plurality of fasteners 60. In the example shown, the ring gear 58 is mounted to an inboard facing surface 62 of the flange case half 40. In this arrangement, the ring gear 58 and differential spider 48 are generally aligned with each other to provide a compact configuration; however, other mounting configurations for the ring gear 58 could be used to accommodate different packaging arrangements of internal carrier components.

The ring gear 58 is in meshing engagement with an input pinion gear 64. The pinion gear 64 includes a shaft portion 66 that is supported for rotation relative to the carrier housing on at least one pinion bearing 68. The pinion gear 64 is received within the tubular extension portion 36 of the backbone. The tubular extension portion 36 is integrally formed as one piece with the backbone 30 such that a separate bolt-on pinion cage is not needed. The pinion gear 64 receives driving input from the power source 22 and includes a pinion head portion 70 that is in direct meshing engagement with the ring gear 58. The shaft portion 66 extends outwardly of the opening 38 while the pinion head portion 70 is located within an internal cavity of the backbone 30.

Figures 3, 6:
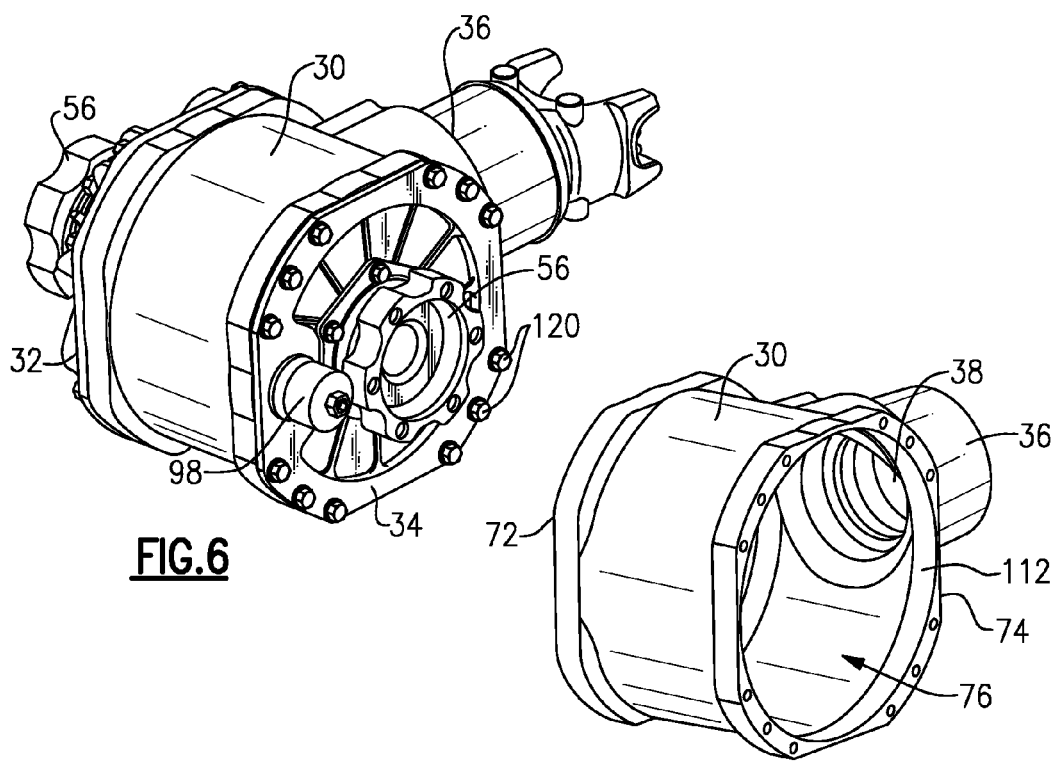
FIG. 3 is a perspective view of the backbone.
FIG. 6 is a perspective view of the carrier assembly of FIG. 2 with the plain and flange side lateral cases attached to the backbone.

As shown in FIG. 3, the backbone 30 includes first 72 and second 74 opposing ends that each define a mounting interface. The ends 72, 74 are open end faces that are substantially enclosed by the first 32 and second 34 lateral cases. The backbone 30 defines an internal cavity 76 that receives the differential. As shown in FIG. 2, the first lateral case 32 comprises a flange side lateral case that is associated with the flange case half 40 of the differential and the second lateral case 34 comprises a plain side lateral case that is associated with the plain case half 42 of the differential. A plain side differential bearing 78 is seated between the plain case half 42 and the plain side lateral case 34. A flange side differential bearing 80 is seated between the flange case half 40 and the flange side lateral case 32.

A first output shaft bearing 82 is seated within the flange side lateral case 32 to rotatably support one output shaft 54. A second output shaft bearing 84 is seated within the plain side lateral case 34 to rotatably support the other output shaft. 54. A bearing cage and adjusting ring member 86 surrounds the first output shaft bearing 82 and includes an end face 88 that abuts against the flange side differential bearing 80. The adjusting ring member 86 is rotated to set desired gear tooth contacts and bearing preload.

The plain side lateral case 34 includes a differential lock housing portion 90 that is configured to receive a differential lock mechanism 92. Any type of differential lock mechanism can be mounted within the differential lock housing portion 90. In the example shown, the differential lock mechanism includes a rod 94 with a piston head 96 that is slidingly received within an air cylinder 98 installed within the differential lock housing portion 90. A shift fork 100 is coupled for movement with the rod 94. The shift fork 100 is configured to move a shift collar 102 into locking engagement with the plain case half 42. The shift collar 102 is coupled to the output shaft 54 via a splined attachment interface such that the collar 102 can slide along the output shaft 54 but cannot rotate relative to the output shaft 54. A resilient member 104 is biased to hold the differential lock mechanism 92 in an unlocked position, i.e. the resilient member 104 holds the shift collar 102 out of engagement with the plain case half 42.

In the unlocked position the differential operates to allow the output shafts 54 to turn at differential speeds from each other as needed, such as when a vehicle is executing a turning maneuver for example. In the locked position, the shift collar 102 locks the associated output shaft 54 to the plain case half 42. This causes the entire differential and both output shafts to rotate together as a unit. To move the shift collar 102 into the lock position, an air signal is communicated to the air cylinder 98 to exert pressure against the piston head 96 to overcome the biasing force of the resilient member 104. This allows the rod 94 to move the shift fork 100 and the shift collar 102 into locking engagement with the plain case half 42.

Figures 4, 5:
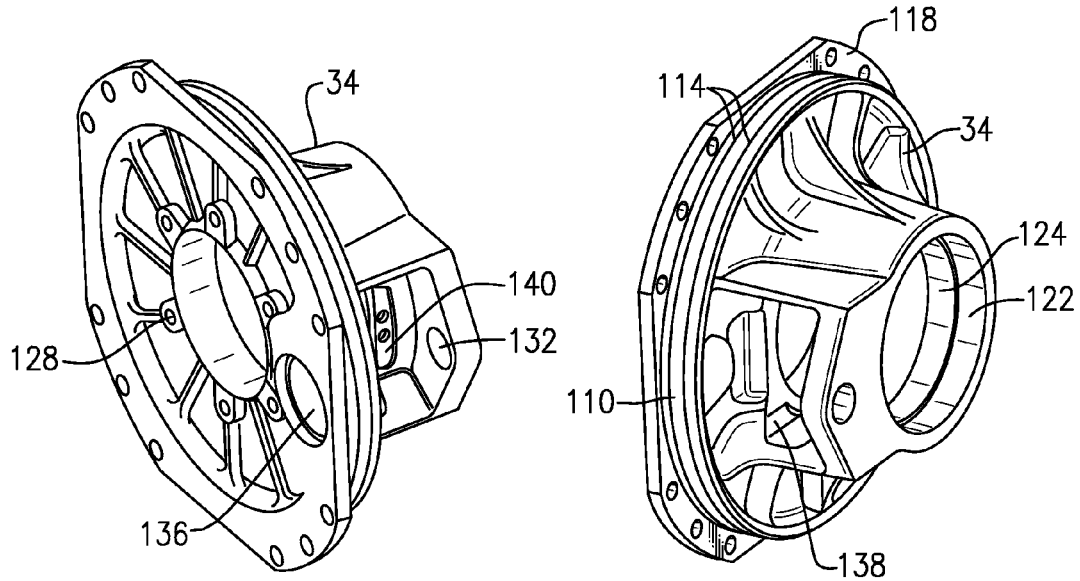
FIG. 4 is a perspective view of the plain side lateral case from one side.
FIG. 5 is a perspective view of the plain side lateral case from an opposite side.

As shown in FIGS. 4-5, the plain side lateral case 34 includes a pilot surface 110 that is formed about an outer periphery and which is positioned against an inner peripheral surface 112 of the backbone 30 (see FIGS. 2-3). The pilot surface 110 includes at least one groove 114 to receive a seal 116 such as an o-ring, for example. In the configuration shown in FIG. 2, two o-ring seals 116 are used to seal the pilot surface 110 against the inner peripheral surface 112 of the backbone 30.

As shown in FIGS. 4-5, the plain side lateral case 34 includes a mounting flange 118 at an outboard end that is attached to the second end 74 of the backbone 30 with a plurality of fasteners 120. An inboard facing end of the plain side lateral case 34 includes a plain side differential bearing bore 122 and a threaded bore 124 to receive an adjusting ring 126 (FIG. 2) used to set bearing preload of the plain side differential bearing. The outboard facing end of the plain side lateral case 34 includes a mount interface 128 for connection to an axle shaft retainer 130 (FIG. 2).

The differential lock housing portion 90 comprises a recessed area positioned on one side of the bearing bore 122. The differential lock housing portion 90 includes a bore 132 (FIG. 4) at one end to receive a bearing 134 to support a distal end of the rod 94. At an opposite end, the differential lock housing portion 90 includes a bore 136 that receives the air cylinder 98. A clearance area 138 is provided for the shift fork 100. Further, a mount interface 140 is provided for one or more set screws 142 associated with the adjusting ring 126.

The flange side lateral case 32 includes a pilot surface 150 that is formed about an outer periphery and which is positioned against the inner peripheral surface 112 of the backbone 30 (see FIGS. 2-3). The pilot surface 150 includes at least one groove 152 to receive a seal 154 such as an o-ring, for example. In the configuration shown in FIG. 2, two o-ring seals 154 are used to seal the pilot surface 150 against the inner peripheral surface 112 of the backbone 30.

In the subject configuration, the plain side lateral case 34 provides a mounting for both the plain side differential bearing and the plain side output shaft bearing. The plain side lateral case 34 also provides mounting for all of the differential lock components. The flange side lateral case provides mounting for both the flange side differential bearing and the flange side output shaft bearing. Thus, the backbone only supports the pinion gear assembly via the extension portion 36.

This mounting arrangement using lateral cases on both sides of a central backbone allows the pinion gear to be loaded from inside the backbone via the internal cavity prior to the bearing seats being installed. The use of a bolt-on pinion cage is no longer needed, even though the bearing location is aligned with the pinion gear, because the bearing seat for the plain side differential bearing is incorporated into the plain side lateral case. Thus, the pinion gear can be installed from inside the internal cavity of the backbone, and then the plain side lateral case can be attached with the plain side differential bearing installed.

One example method of assembly for the carrier includes the following steps. First, the pinion gear 64 is installed internally from within the backbone 30 via one of the open end faces. The pinion gear head 70 is positioned within the internal cavity 76 with the pinion gear shaft portion 66 extends outwardly through the tubular extension portion 36. Next, the plain side lateral case 34 is attached with the associated plain side bearings and differential lock components. The plain side adjusting ring 126 can be used to provide adjustment as needed. Next, the differential with the ring gear 58 attached is installed through the flange side open end of the backbone 30. Tooth contacts between the ring and pinion gears and be checked and adjusted with the adjusting member 126 as needed. Once the desired contacts and preloads are achieved, the adjusting member 126 can then be locked in place. Next, either the plain side output shaft 54 with the shift collar 102 can be installed, or the flange side lateral case 32 can be attached to the backbone. In one example, the plain side output shaft 54 is assembled into the adjusting ring member 86 prior to the adjusting ring member 86 being assembled into the flange side lateral case 32. In another example, an adjusting ring similar to the plain side adjusting ring 126 can be used in the flange side lateral case 32, and the plain side output shaft 54 can be mounted in the same manner as the plain side lateral case assembly with a shaft retainer 130.

FIGS. 7-10 disclose an alternate configuration with a backbone 230, a flange side lateral case 232, and a plain side lateral case 234. In this configuration the flange side lateral case 232 is similar to the flange side lateral case 32 described above. The backbone 230 in this configuration includes a differential assembly as described above; however, the backbone 230 mounts the pinion assembly as well as including a bearing mount 280 for the plain side differential bearing. The backbone 230 also includes a differential lock housing portion 282 that supports some of the differential lock components.

Figure 7:
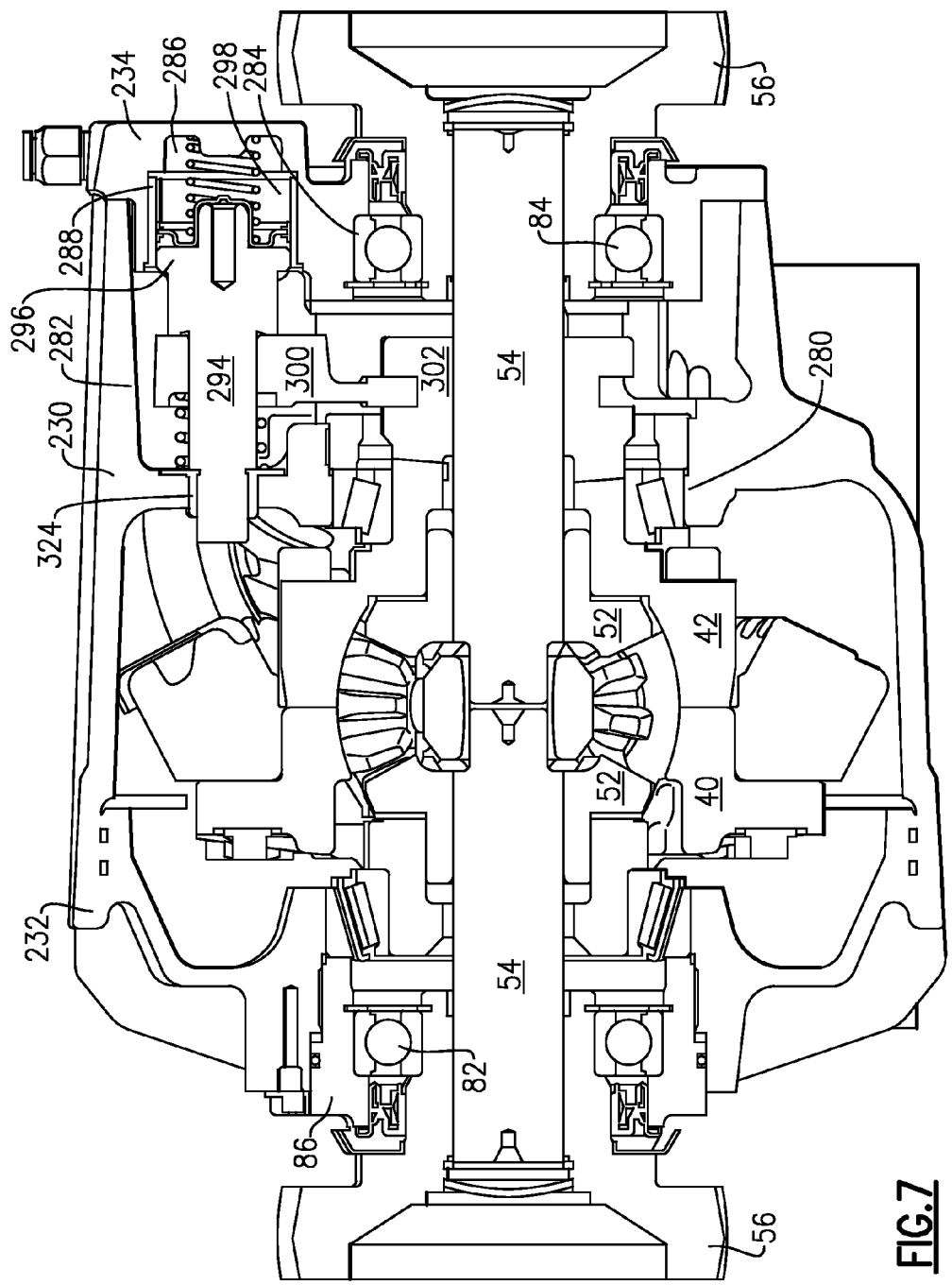
FIG. 7 is a cross-sectional view of another example of a carrier assembly including a backbone, flange side lateral case, and a plain side lateral case.
Figure 8:
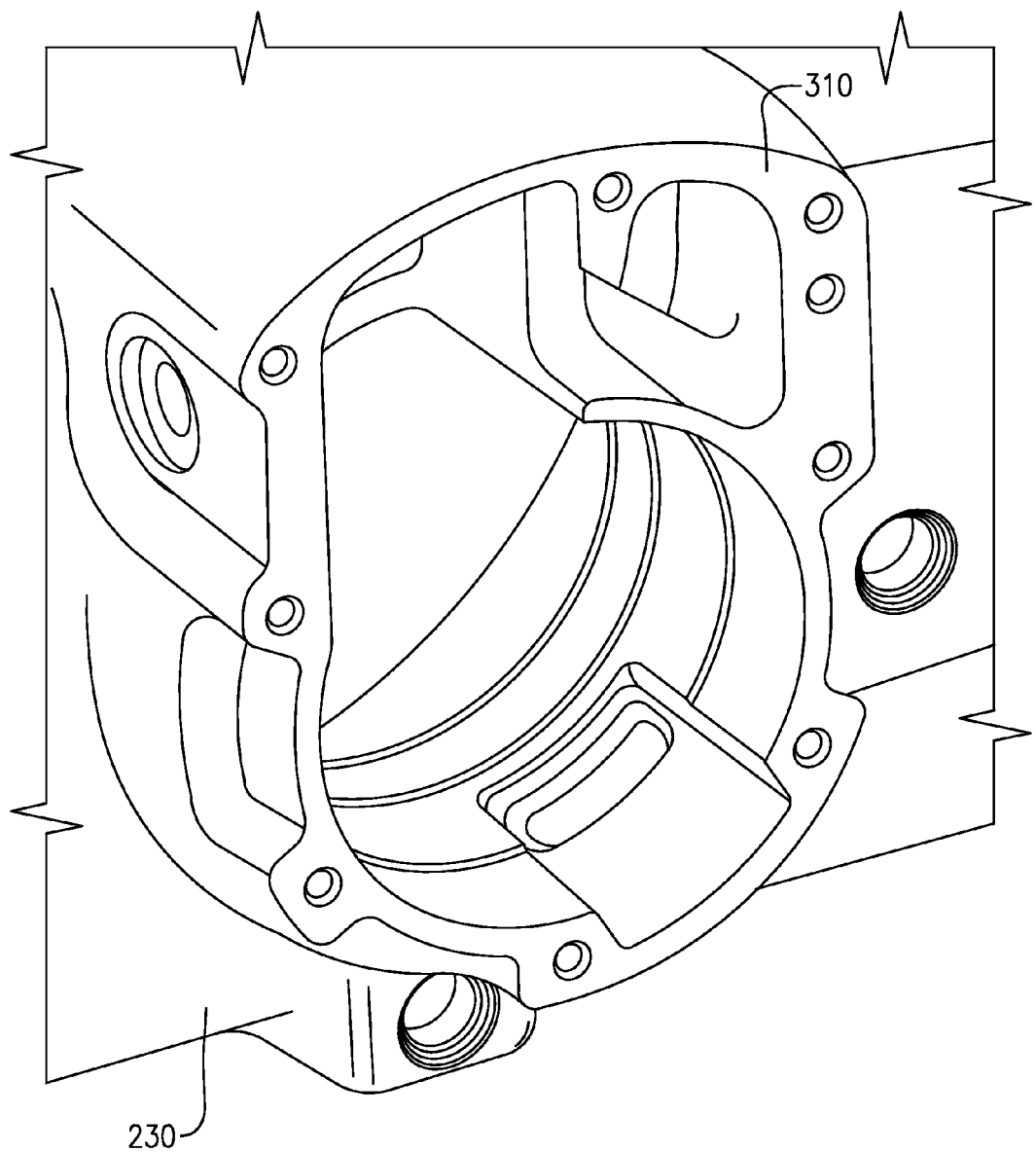
FIG. 8 is a magnified perspective view of a plain side lateral case attachment interface on the backbone.
Figure 9:
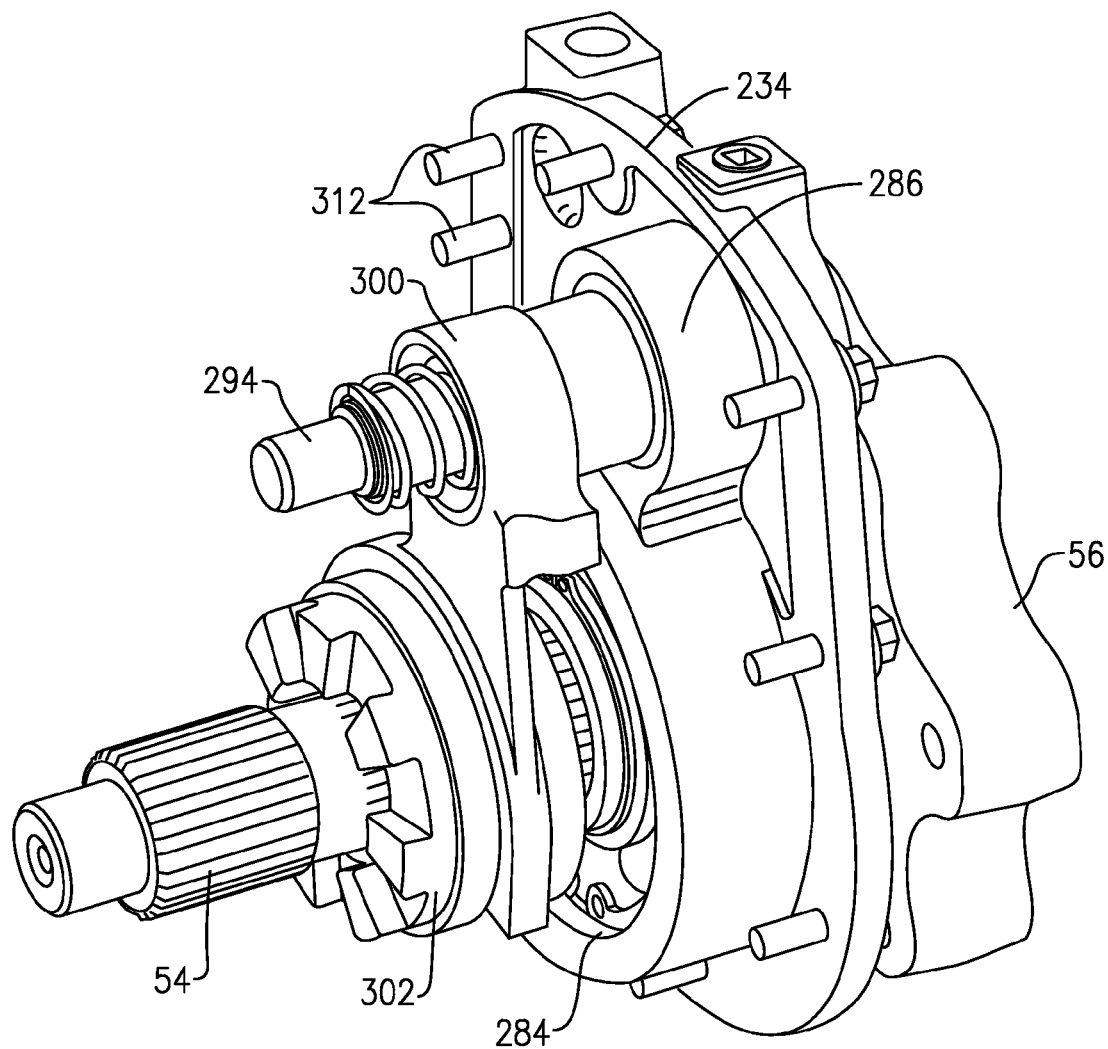
FIG. 9 is the plain side lateral case assembled with a plain side output shaft assembly.
Figure 10:
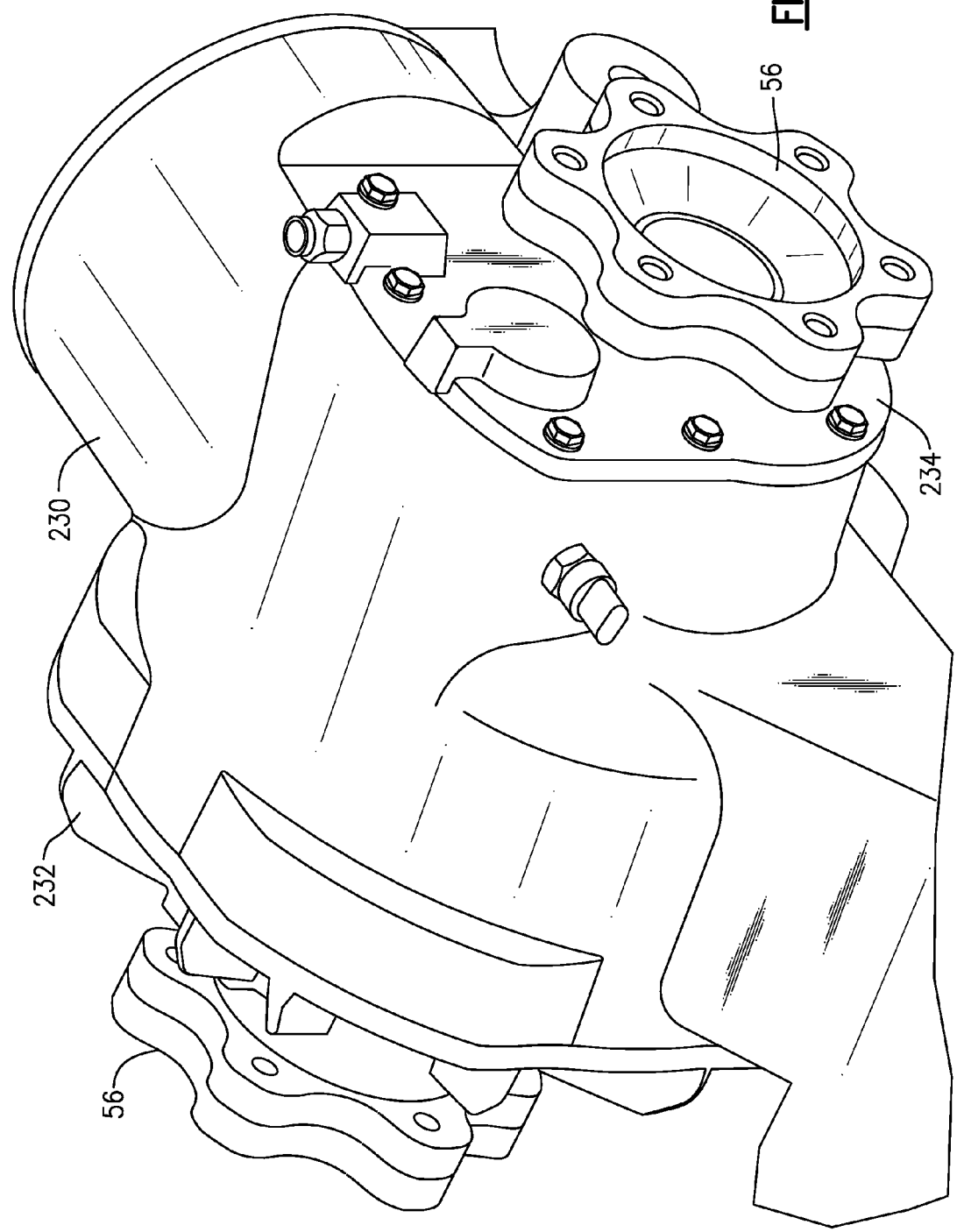
FIG. 10 is a perspective view of the carrier assembly of FIG. 7 with the plain and flange side lateral cases attached to the backbone.

In this configuration, the plain side lateral case 234 includes a bearing mount 284 for the plain side output shaft bearing 84. A differential lock housing portion 286 is formed in the plain side lateral case 234 to provide an actuation area 298 for the differential lock mechanism. This actuation area 298 could receive an air cylinder such as that shown in FIG. 2, or could comprise a cavity, as shown in FIG. 7, to develop air pressure from a direct air line connection. The plain side lateral case 234 is secured to a mounting face 310 (see FIG. 8) of the backbone 230 with a plurality of fasteners 312. A rod 294 of the differential lock mechanism is coupled to a shift fork 300 which moves a shift collar 302 into engagement with the plain case half 42. In one example, the rod 294 includes a piston portion 296 that runs in a steel sleeve 288 received within the actuation area 298. In this example the steel sleeve 288 is used when the plain side lateral case 234 is comprised of an aluminum material that does not have desired wear properties for the piston portion 296. In another example, the plain side lateral case 234 can be comprised of an aluminum material that has been hard anodized, which may eliminate the need for the sleeve 288. The distal end of the rod 294 is seated within a bearing 324 that is mounted within a bore formed within the backbone 230.

In this configuration, the plain side lateral case 234 is more like a cover and does not include a pilot surface for mating to the backbone 230. In this configuration, the plain side lateral case 234 is assembled with a sealant at the mounting face 310. This can be a more time consuming step; however, the backbone is configured to have increased space for other components. The plain side differential bearing 78 and associated adjusting ring 126 are installed in the backbone 230. The flange side differential bearing 80 is installed in the flange side lateral case 232 as described above. In this configuration, the plain side lateral case 234 is the last component assembled to the carrier.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A carrier assembly comprising:
    a differential including a plain case half and a flange case half that are secured together to enclose a differential gear set, said flange case half being rotatably supported by a flange side differential bearing and said plain case half being rotatably supported by a plain side differential bearing;
    a backbone having an internal cavity configured to receive the differential, said backbone including a first end and a second end;
    a first lateral case attached to said first end and comprising a flange side lateral case associated with said flange side differential bearing; and
    a second lateral case attached to said second end and comprising a plain side lateral case associated with said plain side differential bearing, wherein an outer race of said plain side differential bearing is fixed on said plain side lateral case.

2. The carrier assembly according to claim 1, wherein said backbone includes an integrally formed tubular extension that extends outwardly from an outer peripheral surface of said backbone, said tubular extension configured to receive a pinion gear.

3. A carrier assembly comprising:
    a differential including a plain case half and a flange case half that are secured together to enclose a differential gear set, said flange case half being rotatably supported by a flange side differential bearing and said plain case half being rotatably supported by a plain side differential bearing;
    a backbone having an internal cavity configured to receive the differential, said backbone including a first end and a second end;
    a first lateral case attached to said first end and comprising a flange side lateral case associated with said flange side differential bearing; and
    a second lateral case attached to said second end and comprising a plain side lateral case associated with said plain side differential bearing, said plain side lateral case including a bearing mount for said plain side differential bearing, wherein said plain side lateral case includes a differential lock housing portion configured to receive differential lock components.

4. The carrier assembly according to claim 1, wherein said flange side lateral case includes a bearing mount for said flange side differential bearing.

5. The carrier assembly according to claim 4, wherein said differential receives driving input from a ring gear driven by a pinion gear, and wherein said ring gear is fixed to said flange case half of said differential.

6. The carrier assembly according to claim 5, wherein said differential provides driving output to a first output shaft and a second output shaft, and including a first output shaft bearing seated within said flange side lateral case and a second output shaft bearing seated within said plain side lateral case.

7. The carrier assembly according to claim 1 wherein said plain side lateral case includes a pilot surface formed about an outer periphery and sealed against an inner peripheral surface of said backbone with at least one seal.

8. A drive unit for driving a pair of laterally spaced wheels comprising:
    a pinion gear configured to receive driving input from a power source;
    a ring gear driven by said pinion gear;
    a differential including a flange case half and a plain case half secured together to enclose a differential gear set, wherein said flange case half is rotatably supported by a flange side differential bearing and said plain case half is rotatably supported by a plain side differential bearing; and a carrier housing including a backbone having an internal cavity that receives said differential, a flange side lateral case attached to a first end of said backbone, and a plain side lateral case attached to a second end of said backbone, wherein said flange side lateral case seats said flange side differential bearing and said plain side lateral case seats said plain side differential bearing, wherein an outer race of said plain side differential bearing is fixed on said plain side lateral case.

9. A drive unit for driving a pair of laterally spaced wheels comprising:

a pinion gear configured to receive driving input from a power source;

a ring gear driven by said pinion gear;

a differential including a flange case half and a plain case half secured together to enclose a differential gear set, wherein said flange case half is rotatably supported by a flange side differential bearing and said plain case half is rotatably supported by a plain side differential bearing; and a carrier housing including a backbone having an internal cavity that receives said differential, a flange side lateral case attached to a first end of said backbone, and a plain side lateral case attached to a second end of said backbone, wherein said flange side lateral case seats said flange side differential bearing and said plain side lateral case seats said plain side differential bearing, and wherein said plain side lateral case includes a differential lock housing portion configured to receive a differential lock mechanism.

10. The drive unit according to claim 8, wherein said plain side lateral case includes a pilot surface formed about an outer periphery and sealed against an inner peripheral surface of said backbone with at least one seal.

11. The drive unit according to claim 8, wherein said backbone includes an opening formed in an outer peripheral surface of said backbone, said opening configured to receive said pinion gear and wherein said pinion gear is in meshing engagement with said ring gear, said ring gear is fixed to said flange case half of said differential, said differential provides driving output to a first output shaft configured to drive a first wheel and a second output shaft configured to drive a second wheel, and a first output shaft bearing is seated within said flange side lateral case and a second output shaft bearing is seated within said plain side lateral case.

12. The drive unit according to claim 11, wherein the first and second wheels are configured to be connected to a vehicle frame with an independent suspension.

13. A method of assembling a carrier comprising the steps of:

(a) providing a backbone with an internal cavity having first and second open ends, and including an opening formed in an outer peripheral surface of the backbone at a location between the first and second open ends;

(b) installing a pinion gear in the opening;

(c) installing a differential within the internal cavity, said differential including a flange case half and a plain case half that are secured together to enclose a differential gear assembly;

(d) attaching a flange side lateral case to the backbone at the first open end, the flange side lateral case rotatably supporting the flange case half via a flange side differential bearing; and (e) attaching a plain side lateral case to the backbone at the second open end, the plain side lateral case rotatably supporting the plain case half via a plain side differential bearing, wherein said plain side lateral case seats said plain side differential bearing such that an outer race of said plain side differential bearing is fixed on said plain side lateral case.

14. The method according to claim 13, wherein step (b) includes inserting the pinion gear through one of the first and second open ends such that a pinion shaft extends through the opening and a pinion gear head is located within the internal cavity.

15. The method according to claim 13, wherein said flange side lateral case seats said flange side differential bearing.

* * * * *